S. Mills.
Peat Machine.

N° 68,101. Patented Aug. 27, 1867.

Witnesses,
R. J. Dodge
N. C. Woods

Inventor,
Simeon Mills
by Dodge & Munn
his attorneys

United States Patent Office.

SIMEON MILLS, OF MADISON, WISCONSIN.

Letters Patent No. 68,101, dated August 27, 1867.

IMPROVED MACHINE FOR GRINDING PEAT.

*The Schedule referred to in these Letters Patent and making part of the same.*

TO ALL WHOM IT MAY CONCERN:

Be it known that I, SIMEON MILLS, of Madison, in the county of Dane, and State of Wisconsin, have invented invented certain new and useful Improvements in Machines for Grinding Peat and similar substances; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists of a new and improved machine for grinding and compressing peat and similar substances. In the drawings—

Figure 1:
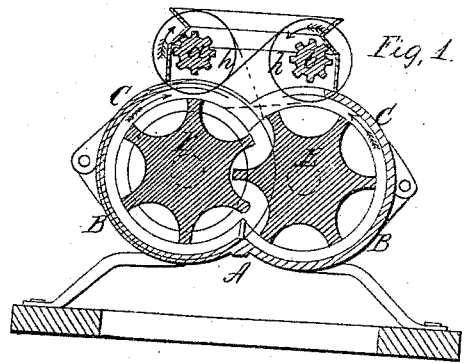
Figure 1 is a vertical sectional view on the line $x$ $x$ of fig. 2.
Figure 2:
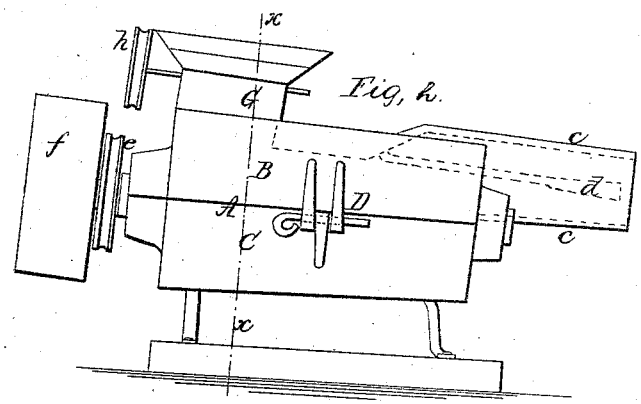
Figure 2 is a side elevation.
Figure 3:
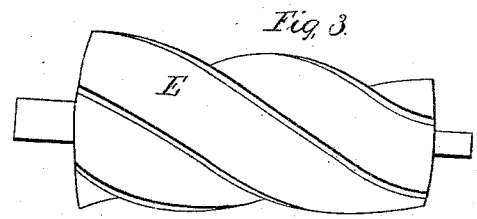
Figure 3 is a view of a portion of the machine detached.

In constructing my machine I make a strong case or box, A, consisting of two parts B C hinged together and closely fitting with a device, D, for fastening them, as shown in fig. 2. Within the case A I mount two spirally fluted conical rollers or screws E, parallel with each other, and with their bearings in either end of the case, in such a way that they will mesh into one another, as shown in fig. 7. Over the feed end of the rollers I place a feed-hopper, G, as shown in fig. 2, and within and near the lower side of the hopper two grooved feed-rollers $a$ $b$ to draw the feed through the hopper G and on to the spirally fluted rollers or screws E. The form of the spirally fluted rollers or screws is shown clearly in fig. 3. At the delivery end of the spirally fluted rollers or screws E I extend the upper side B of the case A, so as to make a square hollow tube, $c$, for the delivery of the substance passing from the rollers F. Within this hollow tube $c$ I insert a mandrel, $d$, tapering in form, by attaching its smaller end to the case A and having its larger end loose and extending nearly to the mouth of the hollow tube $c$, as shown by the dotted lines in fig. 2. The journal of one of the spirally fluted rollers I extend far enough beyond the case A to receive the pulley $e$ and the driving-wheel $f$, as shown in fig. 2. I also extend the journals of the grooved feed-rollers $a$ $b$ far enough beyond the hopper G to receive the pulleys $h$, as shown in fig. 2. I then pass a cord or belt around the pulleys $e$ $h$ $h$ in such a way as to cause the spirally fluted rollers or screws E and the grooved rollers $a$ $b$ to revolve toward each other, as shown by the arrows in fig. 1.

In operating my machine, I throw the peat or other substance into the hopper G. The revolving grooved feed-rollers $a$ $b$ force the peat down upon the spirally grooved rollers E E. As these rollers E E mesh into each other, the turning of one of them causes the other to revolve, and as they revolve the peat is drawn between and ground, and at the same time is forced along their grooves to their delivery end, and there forced into the hollow tube $c$ and through the tube $c$. As the mandrel $d$ is in the centre of the tube $c$, and larger at its outer than at its inner end, the peat, in passing through, is delivered in the shape of a square hollow tube and firmly pressed or formed by the large end of the mandrel.

It is obvious that the spirally fluted rollers may be made conical or straight, as in either case the peat or other substance will be forced along from their feed to their delivery ends, and that they may be placed in either a horizontal or vertical position, and that the machine may be made of metal or wood, or of both combined.

Having thus described my invention, what I claim, is—

1. The spirally fluted cylinders or rollers E, whether conical or straight, so constructed and arranged that both are propelled in a rotatory manner by the application of power to one without gearing, substantially as described and for the purposes set forth.

2. The grooved feed-rollers $a$ $b$, in combination with the fluted rollers E, when constructed and arranged to operate as described and for the purposes set forth.

3. The spirally fluted rollers E, in combination with each other and with the grooved feed-rollers $a$ $b$ and mandrel $d$, when arranged to operate in a close-fitting case, substantially as described and for the purposes set forth.

SIMEON MILLS.

Witnesses:
F. E. DIETRICH,
ADRIAN WEBSTER.